United States Patent
Lohmar et al.

(10) Patent No.: US 11,070,601 B2
(45) Date of Patent: Jul. 20, 2021

(54) DATA RATE ADAPTATION FOR MULTICAST DELIVERY OF STREAMED CONTENT

(71) Applicant: Telefonaktiebolaget LM Ericsson (publ), Stockholm (SE)

(72) Inventors: Thorsten Lohmar, Aachen (DE); Mohamed Ibrahim, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 15/776,468

(22) PCT Filed: Dec. 2, 2015

(86) PCT No.: PCT/EP2015/078407
§ 371 (c)(1),
(2) Date: May 16, 2018

(87) PCT Pub. No.: WO2017/092805
PCT Pub. Date: Jun. 8, 2017

(65) Prior Publication Data
US 2018/0343291 A1    Nov. 29, 2018

(51) Int. Cl.
- H04L 12/00   (2006.01)
- H04L 29/06   (2006.01)
- H04L 1/00    (2006.01)

(52) U.S. Cl.
CPC ........ *H04L 65/4076* (2013.01); *H04L 1/0014* (2013.01); *H04L 1/0025* (2013.01);
(Continued)

(58) Field of Classification Search
CPC .............. H04L 1/0025; H04L 65/4076; H04L 1/0014; H04L 65/605; H04L 65/80; H04L 65/604; H04L 2001/0097
(Continued)

(56) References Cited

U.S. PATENT DOCUMENTS

| | | | |
|---|---|---|---|
| 8,516,144 B2 * | 8/2013 | Hsu .................... | H04N 21/4381 709/231 |
| 8,751,679 B2 * | 6/2014 | McHugh .......... | H04N 21/23439 709/219 |

(Continued)

FOREIGN PATENT DOCUMENTS

WO    WO-2014071500 A1 *  5/2014  ......... H04N 21/8456

OTHER PUBLICATIONS

3rd Generation Partnership Project, 3rd Generation Partnership Project; Technical Specification Group Services and System Aspects; Multimedia Broadcast/Multicast Service (MBMS); Architecture and functional description (Release 12), Technical Specification, 3GPP TS 23.246 V12.5.0, Mar. 1, 2015, pp. 1-67, 3GPP, France.

(Continued)

*Primary Examiner* — Frantz Coby
(74) *Attorney, Agent, or Firm* — Sage Patent Group

(57) ABSTRACT

A client device (100) receives segments of streamed content in a multicast transmission mode. The client device (100) determines an input data rate associated with the receiving of the segments in the multicast transmission mode. Depending on the input data rate, the client device (100) sets an output data rate. In response to requests from a media player (140), the client device (100) outputs the received segments at the output data rate to the media player (140).

18 Claims, 12 Drawing Sheets

(52) U.S. Cl.
CPC .......... *H04L 65/604* (2013.01); *H04L 65/605* (2013.01); *H04L 65/80* (2013.01); *H04L 2001/0097* (2013.01)

(58) Field of Classification Search
USPC .................................................. 709/231, 219
See application file for complete search history.

(56) References Cited

U.S. PATENT DOCUMENTS

| | | | |
|---|---|---|---|
| 9,571,550 B2* | 2/2017 | Mehrotra | H04L 65/607 |
| 9,769,235 B2* | 9/2017 | Schmidt | H04N 21/2343 |
| 2002/0144276 A1* | 10/2002 | Radford | H04N 7/17318 |
| | | | 725/87 |
| 2004/0125877 A1* | 7/2004 | Chang | H04N 21/2343 |
| | | | 375/240.28 |
| 2005/0190781 A1 | 9/2005 | Green et al. | |
| 2006/0031564 A1* | 2/2006 | Brassil | H04L 47/263 |
| | | | 709/233 |
| 2011/0082924 A1 | 4/2011 | Gopalakrishnan | |
| 2011/0126248 A1 | 5/2011 | Fisher et al. | |
| 2011/0164877 A1* | 7/2011 | Li | H04Q 11/0067 |
| | | | 398/66 |
| 2012/0004960 A1* | 1/2012 | Ma | H04L 69/16 |
| | | | 705/14.4 |
| 2013/0051380 A1* | 2/2013 | Lundgren | H04L 1/0015 |
| | | | 370/338 |
| 2013/0297818 A1* | 11/2013 | Nilsson | H04L 47/10 |
| | | | 709/231 |
| 2014/0019593 A1* | 1/2014 | Reznik | H04L 65/60 |
| | | | 709/219 |
| 2014/0089993 A1* | 3/2014 | Huysegems | H04N 21/44209 |
| | | | 725/86 |
| 2014/0143439 A1* | 5/2014 | Ramamurthy | H04N 21/23439 |
| | | | 709/231 |
| 2014/0359155 A1* | 12/2014 | Wan | H04L 65/4076 |
| | | | 709/231 |
| 2015/0030022 A1 | 1/2015 | Mantin | |
| 2015/0067108 A1* | 3/2015 | Mamidwar | H04L 47/621 |
| | | | 709/219 |
| 2018/0343291 A1* | 11/2018 | Lohmar | H04L 65/605 |
| 2018/0352286 A1* | 12/2018 | Rennison | H04N 21/4307 |

OTHER PUBLICATIONS

Office Action issued in corresponding EP application No. 15812984. 1, dated Jun. 6, 2019; 3 pages.

European Office Action issued in corresponding EP Application No. 15812984.1 dated Oct. 12, 2020, 06 Pages.

* cited by examiner

DATA RATE ADAPTATION FOR MULTICAST DELIVERY OF STREAMED CONTENT

TECHNICAL FIELD

The present invention relates to methods for streaming content and to corresponding devices.

BACKGROUND

In communication networks, such as cellular networks as specified by 3GPP (3$^{rd}$ Generation Partnership Project), it is known to use unicast transmissions and multicast or broadcast transmissions for the purpose of delivering streamed content to client devices, e.g., as specified in "Transport of MPEG-2 TS Based DVB Services over IP Based Networks", DVB BlueBook A86 (March 2015). One example is a technology referred to as Multicast Adaptive Bitrate (M-ABR), e.g., as specified in CableLabs "IP Multicast Adaptive Bit Rate Architecture Technical Report", OC-TR-IP-MULTI-ARCH-V01-141112 (2014), which utilizes IP (Internet Protocol) Multicast for scalable and cost efficient delivery in combination with client driven rate adaptation. Specifically, the client device can probe the available link quality and select a stream of segments which complies with this link quality.

In typical scenarios, the last or second last hop in of the transmission chain limits the available bitrate. For example, this hop may extend across a radio link, e.g., based on WLAN (Wireless Local Area Network) or LTE (Long Term Evolution), or a DSL (Digital Subscriber Line) link, which means that throughput is limited by a bitrate limit imposed by the technology, line conditions, radio conditions, or concurrent users.

To allow for utilizing existing kinds of media players and also existing DRM (Digital Rights Management) schemes, it is known to utilize a client-side proxy, which translates between a format used by the media player and a format used for multicast transmissions. The client-side proxy may then manage rate adaptation by joining a multicast channel providing the appropriate quality level for the current link quality.

When the media player joins a multicast-video stream delivered by M-ABR, a tune-in operation is performed. For a typical tune-in operation, it can be assumed that that the each segment of the video stream contains (at least) a full GOP (Group of Picture). In the tune-in operation, the streaming client typically needs to find the start of a segment, which contains required information for processing the video stream, such as decoding of video content. When using MPEG-TS (MPEG-TS: "Motion Picture Experts Group Transport Stream") based segments, each segments starts with a Program Association Table (PAT), followed by a Program Map Table (PMT) and then it continues with an I-Frame start. The I-Frame is the first frame in a GOP. The start of a segment therefore typically acts as an access point for the video stream.

Typically, the streaming client tunes-in to the multicast video stream at an arbitrary point of time, e.g., triggered by the user selecting a channel. Then the streaming client needs to wait until the start of a segment is found and the information required for processing the video stream can be received. Then, buffering of the video content can start. However, it may take some time until the buffer has reached a sufficient fill level and to start playback of the video stream.

In order to speed up filling the buffer during the tune-in operation, solutions referred to as "Fast Channel Change (FCC)", e.g., as specified in "Server-Based Fast Channel Change in DVB-IPTV Systems", DVB BlueBook A152 (August 2010), or "Rapid Acquisition of Multicast Streams" (RAMS), e.g., as specified in RFC 6285 (June 2011), additionally utilize unicast delivery of the streamed content. Specifically, the streaming client requests a unicast burst of data to fill up the buffer using RTP (Real-time Transport Protocol). The duration of the unicast burst may be calculated assuming a certain overspeed (e.g. transmission of the unicast burst at 130% of the multicast bitrate). However, in some scenarios it is not straightforward to find an appropriate point of time for switching from the unicast delivery to the multicast delivery. This may result in excessive length of the unicast burst and overloading of the utilized radio link by data transmitted both in the unicast delivery mode and the multicast delivery mode. Specifically when utilizing a link with limited capacity such redundant transmission of parts of the stream is undesirable.

Further, for some existing player technologies supporting dynamic bitrate adaptation of the delivered content, utilization of multicast delivery of the content through a client-side proxy may be problematic due to certain characteristics of the player technology. An example of such player technology is the DASH (Dynamic Adaptive Streaming over HTTP) technology as specified in ISO/IEC standard 23009-1 "Information technology—Dynamic adaptive streaming over HTTP (DASH)—Part 1: Media presentation description and segment formats", Second edition (May 15, 2014).

In the case of the DASH technology, problems may arise due to timing differences between multicast delivery and unicast delivery of segments: A DASH media player calculates a Segment Availability Start time (SAST) for each individual segment of the streamed content from an Availability Start Time (AST) value indicated in a media description referred to as MPD (Media Presentation Description). The SAST corresponds to a time at which a certain segment is available for fetching at an origin of the DASH stream. When using a client-side proxy to receive the segments from the origin, the SAST indicated in the MDP will be earlier than the availability at the client-side proxy.

Further, in the case of the DASH technology parameters referred to as Picture Parameter Set (PPS) and Sequence Parameter Set (SPS) are transmitted in a dedicated segment, referred to as Initialization Segment, separately from segments including the actual media content. The SPS and PPS provide important configuration information for decoding in the DASH player, such as resolution (e.g. 1920×1080). When the Dash media player switches from one quality level to another, it typically needs information from different Initialization Segments. It therefore not possible to change the quality level without awareness of the DASH media player since otherwise the DASH media player might apply the wrong Initialization Segment. Rather, the DASH media player should control adaptation of the quality level.

Further, in when using multicast delivery of DASH segments through a client-side proxy, the DASH media player will typically regard the client-side proxy as source of the DASH segments, which may affect the DASH media player's ability to estimate a relevant link bitrate for transmission the DASH segments: From perspective of the DASH media player, the segments are received through a link to the client-side proxy, which may have a significantly higher capacity than a link through which the client-side proxy receives the DASH segments from their origin. Accordingly, the DASH media player may not be able to see and assess the link which actually limits the transmission of the DASH segment and thus incorrectly select the quality-level.

Accordingly, there is a need for techniques which allow for efficiently streaming content using multicast delivery and quality-level adaptation by a media player.

SUMMARY

According to an embodiment of the invention, a method of streaming content is provided. According to the method, a client device receives segments of streamed content in a multicast transmission mode. The client device determines an input data rate associated with the receiving of the segments in the multicast transmission mode. Depending on the input data rate, the client device sets an output data rate. In response to requests from a media player, the client device outputs the received segments at the output data rate to the media player.

According to a further embodiment of the invention, a client device is provided. The client device is configured to receive segments of streamed content in a multicast transmission mode. Further, the client device is configured to determine an input data rate associated with the receiving of the segments in the multicast transmission mode. Further, the client device is configured to set an output data rate depending on the input data rate. Further, the client device is configured to, in response to requests from a media player, output the received segments at the output data rate to the media player.

According to a further embodiment of the invention, a computer program or computer program product is provided, e.g., in the form of a non-transitory storage medium, which comprises program code to be executed by at least one processor of a client device. Execution of the program code causes the client device to receive segments of streamed content in a multicast transmission mode. Further, execution of the program code causes the client device to determine an input data rate associated with the receiving of the segments in the multicast transmission mode. Further, execution of the program code causes the client device to set an output data rate depending on the input data rate. Further, execution of the program code causes the client device to, in response to requests from a media player, output the received segments at the output data rate to the media player.

Details of such embodiments and further embodiments will be apparent from the following detailed description of embodiments.

DETAILED DESCRIPTION OF EMBODIMENTS

Figure 1:
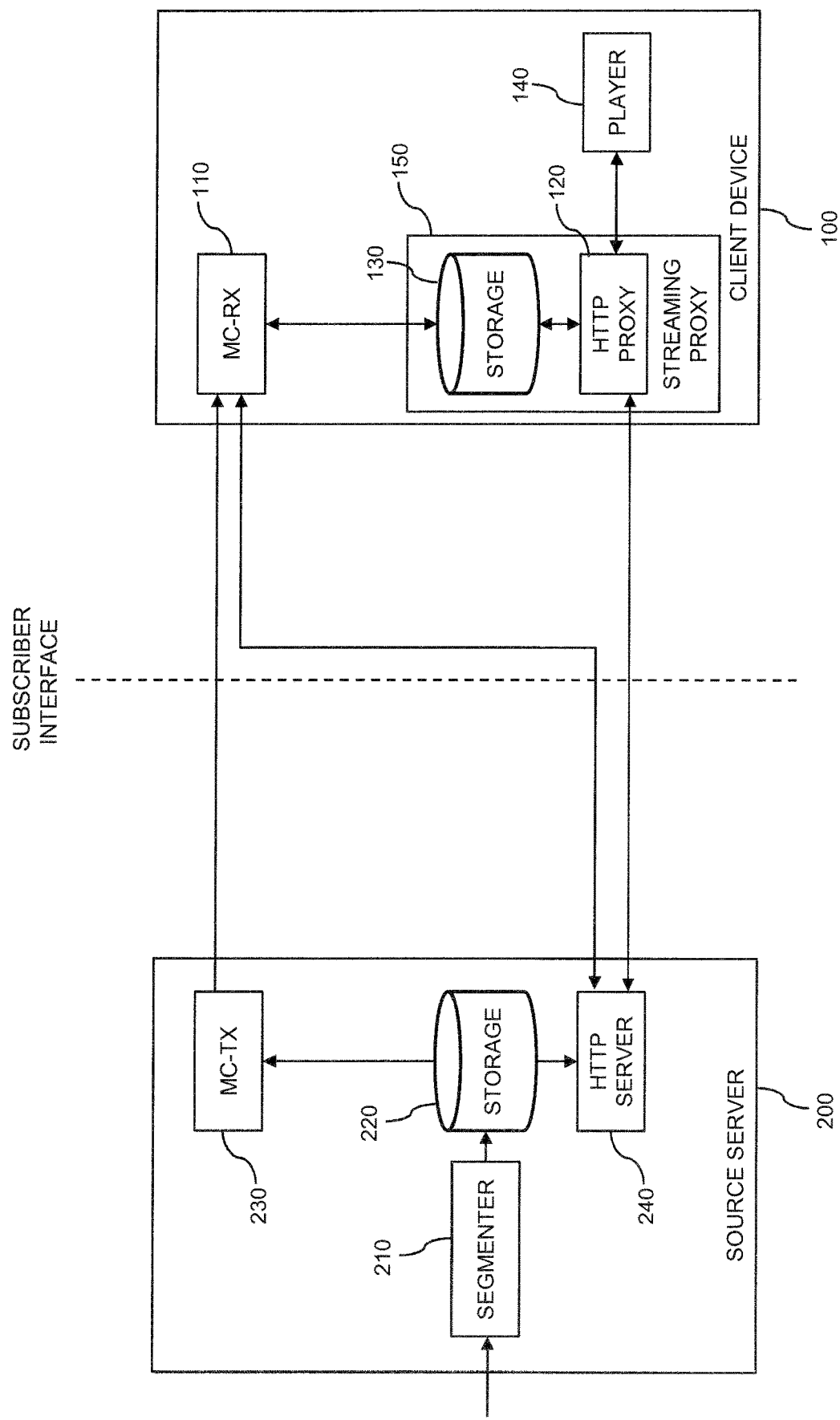
FIG. 1 schematically illustrates a communication network system for implementing streaming of content according to an embodiment of the invention.

In the following, concepts in accordance with exemplary embodiments of the invention will be explained in more detail and with reference to the accompanying drawings. The illustrated embodiments relate to streaming of content in a communication network. The communication network is assumed to enable delivery of streamed content from a server to one or more media players. For example such media player may be connected through a radio interface to the server. Such radio interface may for example be based on a cellular radio technology, e.g., the LTE technology, or on a WLAN radio technology. Further, such media player may also be connected through a wire based technology to the server. Such wire based technology may for example be based on a DSL technology, a coaxial cable networking technology, or an optical fiber networking technology. In some scenarios, also combinations of such technologies may be used for connecting the media player to the server. The streamed content may for example correspond to multimedia content, for which typically continuous playback by the media player is desired.

In the illustrated concepts, a multicast transmission mode is utilized for delivery of streamed content from the server to a certain media player. As used herein, the "multicast transmission mode" refers to a transmission mode in which a single transmission is intended for multiple recipients. The multicast transmission mode may also correspond to a broadcast transmission mode, in which a single transmission is intended for all recipients in a certain coverage area. The multicast transmission mode may for example be based on IP Multicast as specified in IETF RFC 1112 (August 1989), FLUTE as specified in RFC3926 (October 2004), and/or FCAST as specified in RFC 6968 (July 2013).

In the concepts illustrated herein, it is assumed that the media player is based on a streaming technology in which the media player controls a quality level in which segments of the streamed content are received. Specifically, the media player requests segments of the streamed content with a quality level which depends on a data rate at which the segments of the streamed content are supplied to the media player. In the examples illustrates below, it is assumed that the media player is based on the DASH technology as specified in ISO/IEC standard 23009-1 "Information technology—Dynamic adaptive streaming over HTTP (DASH)—Part 1: Media presentation description and segment formats", Second edition (May 15, 2014). However, it is to be understood that the illustrated concepts could be applied in a corresponding manner to other streaming technologies in which the media player is responsible for setting the quality level of requested segments of the streamed content.

In the illustrated concepts, a client device provides proxy functionalities for receiving the segments of the streamed content in the multicast transmission mode and supplying the segments to the media player, upon request by the media player. The media player may be part of the client device or may be provided separately therefrom. For example, if the media player is provided separately from the client device, it may be connected to the client device through a LAN (Local Area Network) link. In any case, the capacity of a link for supplying the segments of the streamed content from the client device to the media player (internally or externally) may be significantly higher than the capacity of a link used for transmission of the segments from the server to the client device, which means that the media player itself might not be able to properly estimate a data rate or link capacity which is actually relevant for the delivery of the segments to the media player, i.e., which acts as a bottleneck with respect to the delivery of the segments to the media player. In the illustrated concepts, this issue is addressed by performing rate adaptation in the client device. Specifically, the client device may estimate an input data rate determining at which the client device receives the segments in the multicast transmission mode and set an output data rate depending on the estimated input data rate. In response to requests from the media player, the client device then outputs the received segments at this output data rate to the media player. By selecting a lower output data rate, the media player can be stimulated to request the segments of the streamed content at a lower quality level. By selecting a higher output data rate, the media player can be stimulated to request the segments of the streamed content at a higher quality level.

Further a unicast transmission mode may be used in addition to the multicast transmission mode, e.g., with the aim of expediting "tuning in" to reception of the streamed content in the multicast transmission mode and avoiding delays before the media player can start with playback of the streamed content. Here, the "unicast transmission mode" refers to a transmission mode in which a transmission is addressed to only one recipient. The multicast unicast transmission mode may for example be based on HTTP as specified in IETF RFC 7230 (June 2014) or protocols derived therefrom. A synchronization stream, in the following also referred to as "sync stream" may be provided for enabling the client device to efficiently control switching from receiving the streamed content in the unicast transmission mode to receiving the streamed content in the multicast transmission mode. Specifically, this switching may be controlled with the aim of avoiding redundant transmission of parts of the streamed content in both the unicast transmission mode and the multicast transmission mode. Accordingly, excessive utilization of a link with limited capacity, e.g., an LTE or WLAN radio link or a DSL link, can be avoided. The sync stream indicates a timing of segments of the streamed content transmitted in the multicast transmission mode. This is accomplished separately from the streamed content, i.e., the sync stream does not include the streamed content. Accordingly, the sync stream can be transmitted at a low bitrate, without significant utilization of the limited link capacity. From the sync stream the client device may determine when a certain segment of the streamed content will be transmitted in the multicast transmission mode and then switch to receiving this segment. Before this switching, the client device may receive a set of preceding segments in the unicast transmission mode. The latter segments may for example be used for expedited filling of a buffer storing the streamed content at the client device. In typical scenarios, this may allow for starting playback of the streamed content in less than a second.

FIG. 1 schematically illustrates an example of a system which may be utilized in a communication network for streaming of content as outlined above. As illustrated, the system is based on a client device 100 and a source server 200. Through the communication network, the client device 100 is connected to the source server 200. As illustrated, the connection of the client device 100 to the source server 200 extends across a subscriber interface, e.g., a radio link based on LTE or another cellular radio technology or a WLAN radio technology, or a wire-based link, such as a DSL link.

A segmenter 210 is provided for generating segments of the streamed content. In the example of FIG. 1, the segmenter 210 is assumed to be part of the source server 200. However, it is to be understood that the segmenter 210 could also be provided separately from the source server 200, e.g., by a content provider from which the streamed content originates. The segmenter 210 converts the streamed content to at least one stream of segments. In some scenarios, the segmenter 210 may convert the streamed content to multiple streams of segments, and each of these multiple streams may convey the streamed content in a different quality level. The streamed content may for example correspond to multimedia content, e.g., video content or audio content. In the example as further detailed below, it is assumed that the streamed content corresponds to video content, and the streams each correspond to a DASH/MPEG-TS or DASH ISO BMFF (ISO base media file format) stream. In view of the utilized DASH technology, the streams will in the following also be referred to as DASH streams.

As further illustrated, the source server 200 is further provided with a storage 220. The storage 220 receives the segments of the streamed content from the segmenter 210 and stores them so that they are available for transmission in the multicast transmission mode and/or unicast transmission mode. The storage 220 may for example be based on one or more hard disks or similar kinds of mass storage technology.

As further illustrated, the source server 200 is provided with a multicast transmitter (MC-TX) 230. The MC-TX 230 is responsible for transmission of the segments of the streamed content in the multicast transmission mode. In the illustrated example, it is assumed that the streamed content is transmitted in multiple streams of different quality levels. The MC-TX 230 thus sets up multiple multicast groups, each corresponding to one of the quality levels, and transmits the segments of a given quality level in the corresponding multicast group. The multicast transmission mode may for example utilize a multicast file delivery protocol such as FLUTE as specified by IETF RFC 6726 or FCAST as specified by IETF RFC 6968. Such multicast file delivery protocol may operate in connection with a multicast or broadcast service supported by the communication network, such as MBMS (Multimedia Broadcast Multicast Service) as specified by 3GPP TS 23.246 V12.5.0 (March 2015) and/or IP multicast as specified by IETF RFC 1112.

As further illustrated, the source server 200 is provided with an HTTP server 240. The HTTP server is responsible for transmission of the segments of the streamed content in the unicast transmission mode. In the illustrated example, it is assumed that the uncast transmission mode is based on conventional HLS mechanisms, such as using the HTTP GET method for receiving a request for a segment and transmitting the segment in response to such request.

The client device 100 is provided with a multicast receiver (MC-RX) 110 which is responsible for receiving the segments of the streamed content transmitted in the multicast transmission mode. For this purpose, the MC-RX 110 may join one of the multicast groups set up by the MC-TX 230. Here, it should be noted that in typical scenarios the MC-TX 220 will transmit the segments even if the MC-RX 110 has not joined one of the multicast groups, e.g., to enable reception of the segments by other client devices. Nonetheless, the load on the subscriber interface may depend on whether the MC-RX 110 has joined one of the multicast groups and on which multicast group was joined by the MC-RX 110. For example, it is typically more efficient to deliver the segments of the streamed content across the subscriber interface if the MC-RX 110 actually joined the corresponding multicast group. In some scenarios, the MC-RX 110 may also support a file repair mechanism, e.g., based on using HTTP for requesting missing data from the HTTP server 240. For example, the MC-RX 110 may request missing data packets using packet numbers, e.g., as identified by a FEC (Forward Error Correction) payload identifier such as SBN (Source Block Number) and ESI (Encoding Symbol Identifier). Further, the MC-RX 110 may request a certain range from an incompletely received segment, e.g., using an HTTP range header.

As further illustrated, the client device 100 is provided with an HTTP proxy 120. The HTTP proxy 120 is responsible for receiving the segments of the streamed content transmitted by the HTTP server 240 in the unicast transmission mode. In the illustrated example, it is assumed that the uncast transmission mode is based on conventional DASH mechanisms.

These mechanisms for example involve using the HTTP GET method for transmitting a request for a segment and receiving the segment in response to such request.

Further, the client device 100 is provided with a storage 130 in which the segments received by the MC-RX 110 and the HTTP proxy 120 are stored. The storage 130 may be implemented on the basis of one or more mass storage devices, such as hard disks, solid state disks, or flash memory devices.

As further illustrated, the client device 100 is provided with a media player 140 which is responsible for playback of the streamed content. The media player 140 typically implements an HTTP client. For this purpose, the media player 140 fetches segments of the streamed content through the HTTP proxy 120 from the storage 130 and processes the data of the segments as required for the playback. This may for example involve decoding video data and/or audio data. In accordance with the conventional DASH mechanisms, the media player 140 may first buffer three segments before rendering of the streamed content starts. The fetching of the segments by the media player 140 may be based on conventional DASH mechanisms, such as using the HTTP GET method for transmitting a request for a segment and receiving the segment in response to such request. Accordingly, the HTTP proxy 120 and the storage 130 may act as a streaming proxy 150 for the HTTP based transactions of DASH mechanisms implemented by the media player 140. However, this streaming proxy 150 will not only utilize the conventional DASH mechanisms for receiving the streamed content based on the unicast transmission mode from the HTTP server 240, but also utilize the multicast transmission mode to receive the streamed content via the MC-RX 110.

The HTTP proxy 120 may be realized as an HTTP server combined with an HTTP client, e.g., as a back-to-back server acting as a HTTP client towards the source server 200 and an HTTP server towards the media player 140.

It should be noted that while FIG. 1 illustrates the media player 140 as part of the client device 100, it is also possible to provide the media player 140 separately from the client device 100. For example, the client device could correspond to a home gateway, and the media player 140 could be implemented by a multimedia device connected through home networking to the home gateway, e.g., by a TV, a Blu-Ray or DVD player, a gaming console, a tablet computer, a smartphone, a laptop computer, or a desktop computer.

From the perspective of the media player 140, this combined usage of the unicast transmission mode and the multicast transmission mode may be implemented in a transparent manner, so that from the perspective of the media player 140 the streaming proxy 150 appears as the source of the segments of the streamed content. Accordingly, the media player 140 may operate on the basis of conventional DASH mechanisms, including rate adaptation, i.e., requesting of segments of the streamed content at a quality level which depends on a data rate or link capacity as estimated by the media player 140 with respect to the segments as received from the streaming proxy 150.

Accordingly, if the streaming proxy 150 outputs the segments at a higher output data rate to the media player 140, this may cause the media player 140 to request the segments of the streamed content at a higher quality level. The MC-RX 110 may receive the segments of this higher quality level by joining the corresponding multicast group. Similarly, if the streaming proxy 150 outputs the segments at a lower output data rate to the media player 140, this may cause the media player 140 to request the segments of the streamed content at a lower quality level. The MC-RX 110 may receive the segments of this lower quality level by joining the corresponding multicast group.

In the illustrated example, the streaming proxy 150 is further assumed to be capable of modifying an MPD (Media Presentation Description) of the DASH stream (e.g., DASH/MPEG-TS or DASH ISO BMFF stream) which is provided by the source server 200 and forwarded to the media player 140. Specifically, an AST (Availability Start Time) indicated by the MPD is shifted to a later time, such that the media player 140 requests older segments from the streaming proxy 150 than currently available at the source server 200. This delay provides the streaming proxy 150 with sufficient time to retrieve segments using unicast delivery until a sufficient buffer fill level is reached and the next segment can be received using the multicast transmission mode. Further, this delay may be used to prevent the media player 140 from requesting a segment which is not yet available at the streaming proxy 150.

Figure 2:
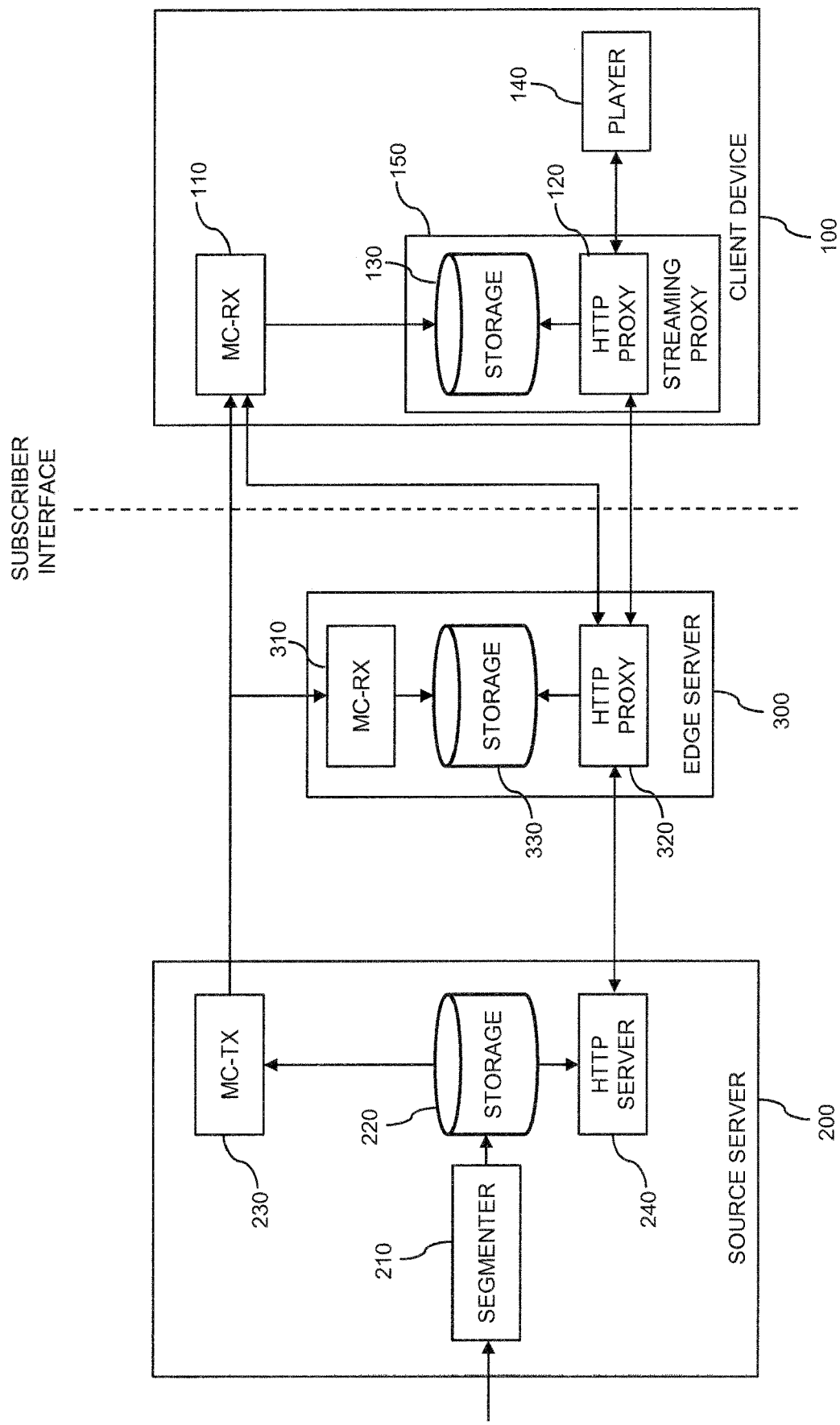
FIG. 2 schematically illustrates a further communication network system for implementing streaming of content according to an embodiment of the invention.

FIG. 2 schematically illustrates a further example of a system which may be utilized in a communication network for streaming of content as outlined above. The system of FIG. 2 includes a client device 100 and a source server 200. Further, the system includes an edge server 300. As compared to the source server 200, the edge server is located closer to the client device 100. Through the communication network, the client device 100 is connected to the source server 200 and to the edge server 300. As illustrated, the connection of the client device 100 to the source server 200 and to the edge server 300 extends across a subscriber interface, e.g., a radio link based on LTE or another cellular radio technology or a WLAN radio technology, or a wire-based link, such as a DSL link. The system of FIG. 2 is in many aspects similar to the system of FIG. 1, and in FIG. 2 elements which correspond to those of FIG. 1 have been identified by the same reference signs. In the following it will be refrained from repeatedly describing elements or functionalities which correspond to those of FIG. 1.

In the system of FIG. 2, the edge server 300 may act as a local source for fetching segments of the streamed content using the unicast transmission mode. In this way, a load contribution within the communication network associated with the transmission of segments in the unicast transmission mode, specifically in view of situations in which multiple client devices request the same segment. Such unicast requests may be handled in a more efficient manner by locating additional sources of the segments as close as possible to the client devices.

In the illustrated example, the edge server 300 is provided with a multicast receiver (MC-RX) 310 which is responsible for receiving the segments of the streamed content transmitted in the multicast transmission mode. For this purpose, the MC-RX 310 may joins the multicast groups set up by the MC-TX 230. Further, the edge server 300 is provided with an HTTP proxy 320. The HTTP proxy 320 is responsible for receiving the segments of the streamed content transmitted by the HTTP server 240 in the unicast transmission mode and for forwarding the received segments in the unicast transmission mode towards requesting client devices, e.g., towards the client device 100. Further, the edge server 300 is provided with a storage 330 in which the segments received by the MC-RX 310 and the HTTP client 320 are stored. The storage 130 may be implemented on the basis of one or more mass storage devices, such as hard disks, solid state disks, or flash memory devices.

As compared to the system of FIG. 1, the HTTP proxy 120 of the client device 100 may issue requests for transmission of segments in the unicast transmission mode towards the HTTP proxy 320 of the edge server 300, and the HTTP proxy 320 of the edge server 300 may respond to such request by transmitting the requested segment from the storage 330. Only if the requested segment is not available in the storage 330, the HTTP proxy 320 may need to request the segment from the HTTP server 240 of the source server 200. It can thus be avoided that the unicast transmission mode generates excessive load within the communication network, in particular on a link between the source server 200 and the edge server 300. The multicast transmission mode supports a file repair mechanism, the edge server 300 may also act as a source from which the MC-RX 110 can request the data needed for file repair. For example, the MC-RX 110 may use HTTP for requesting missing data from the HTTP proxy 320. For example, the MC-RX 110 may request missing data packets using packet numbers, e.g., as identified by a FEC payload identifier such as SBN and ESI. Further, the MC-RX 110 may request a certain range from an incompletely received segment, e.g., using an HTTP range header.

In addition to transmitting the stream(s) including the segments of the streamed content, in the following also referred to as multicast content streams, the MC-TX 240 in the systems of FIGS. 1 and 2 may further transmits the above-mentioned sync stream, which does not include the streamed content but rather indicates a timing of the segments in the multicast content streams. The sync stream may be generated by the MC-TX 230. Similar to the multicast content streams, the sync stream is received by the MC-RX 110 of the client device 100.

The sync stream may indicate the timing of the segments of the multicast content streams by being organized in segments which are transmitted synchronously with the segments of the multicast content streams and include an identifier of the synchronously transmitted segment of the multicast content stream. In the illustrated example, this identifier corresponds to a sequence number and a URL (Uniform Resource Locator) of the segment of the multicast content stream.

From the sync stream, the client device 100 may derive when a specific segment, identified by a certain sequence number and URL, will become available in the multicast content stream. In particular, the client device 100 may utilize the indicated timing to determine segment boundaries relative to reception and switch from reception of the streamed content in the unicast transmission mode (by the HTTP proxy 120) to reception of the streamed content in the multicast transmission mode (by the MC-RX 110) at the start of a certain segment in the multicast content stream. This allows for avoiding redundant transmission of this segment in the unicast transmission mode, while at the same time enabling the client device 100 to receive information transmitted at the start of the segment which is required for processing the segment. For example, when using a DASH/MPEG-TS, a PAT and PMT are transmitted at the start of a segment, and receiving this information may enable the media player 140 start processing of the segment without further delay.

Figure 3:
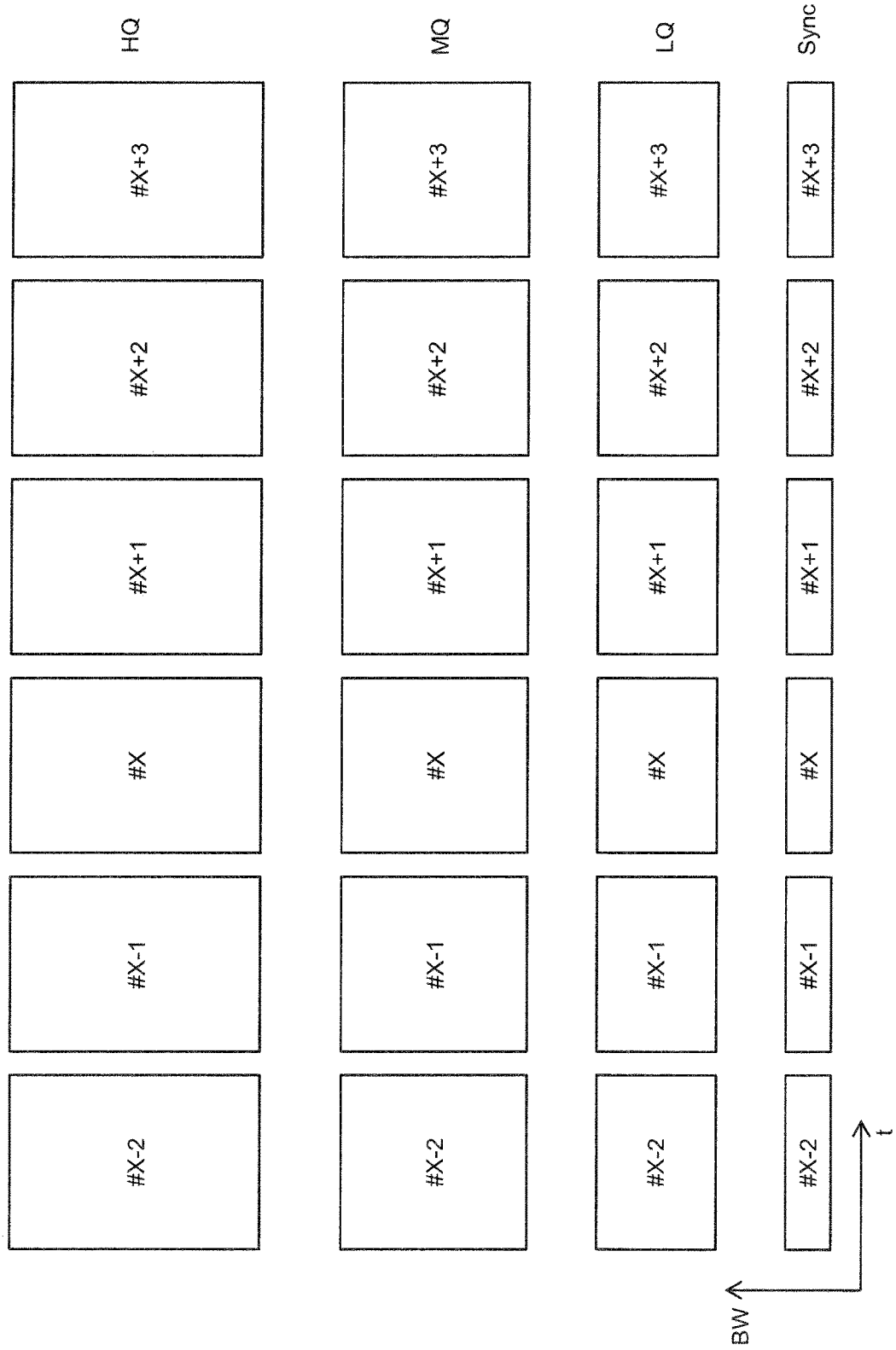
FIG. 3 schematically illustrates multicast streams as utilized according to an embodiment of the invention.

FIG. 3 schematically illustrates an example of how the multicast content streams and the sync stream may be organized. In the illustrated example, three multicast content streams of different quality levels are provided: a high-quality multicast content stream (designated by HQ), a medium quality multicast content stream (designated by MQ), and a low quality multicast content stream (designated by LQ). As can be seen, a bandwidth (BW) required for transmission of the multicast content stream increases with the quality level, and a bandwidth required for transmission of the sync stream is even lower than the bandwidth required for transmission of the low quality multicast content stream, because the sync stream does not include the streamed content. The segments of the multicast content streams are separated by gaps which provide the client device 100 with sufficient time for switching between the different quality levels, without missing a segment.

As further illustrated, each of the segments of the multicast content streams is identified by a sequence number ( . . . , #X-2, #X-1, #X, #X+1, #X+2, #X+3, . . . ). The sequence number may be utilized for identifying the position of a given segment in the stream. In addition, each segment may also be identified by a URL. The URL may also be utilized for requesting transmission of the segment in the unicast transmission mode. Further, the URL may also allow for distinguishing between the segments of different quality levels. It should be noted that the sequence numbers may be incremented by one from one segment to the next segment of the stream, as illustrated in FIG. 3. However, other step sizes could be utilized as well, e.g., a step size corresponding to a time duration of the segment.

As further illustrated, the sync stream is organized in segments which are transmitted synchronously with the segments of the multicast content streams and carry the same sequence number as the synchronously transmitted segments of the multicast content streams. Further, the segments of the sync stream may also indicate the URLs of the synchronously transmitted segments of the multicast content streams. Accordingly, by receiving and analyzing the sync stream, the client device 100 may determine when a certain segment will become available in one of the multicast content streams, without receiving the multicast content stream. Further, the client device 100 may infer from the sync stream which segments of the streamed content should be fetched by the unicast transmission mode, to expedite buffer filling and reduce an associated delay before playback of the streamed content can start. Each segment of the multicast content stream may be represented by two IP packets in the sync stream, one at the beginning of the segment and one at the end of the segment.

Further, the streaming proxy 150 may also utilize the timing information derived from the sync stream as input when modifying the MPD. Specifically, the streaming proxy 150 may infer from the sync stream a time when a certain segment will become available through multicast, and compare this time to the SAST of this segment indicated by the MPD, and shift the AST of the MPD by a corresponding offset.

Figure 4:
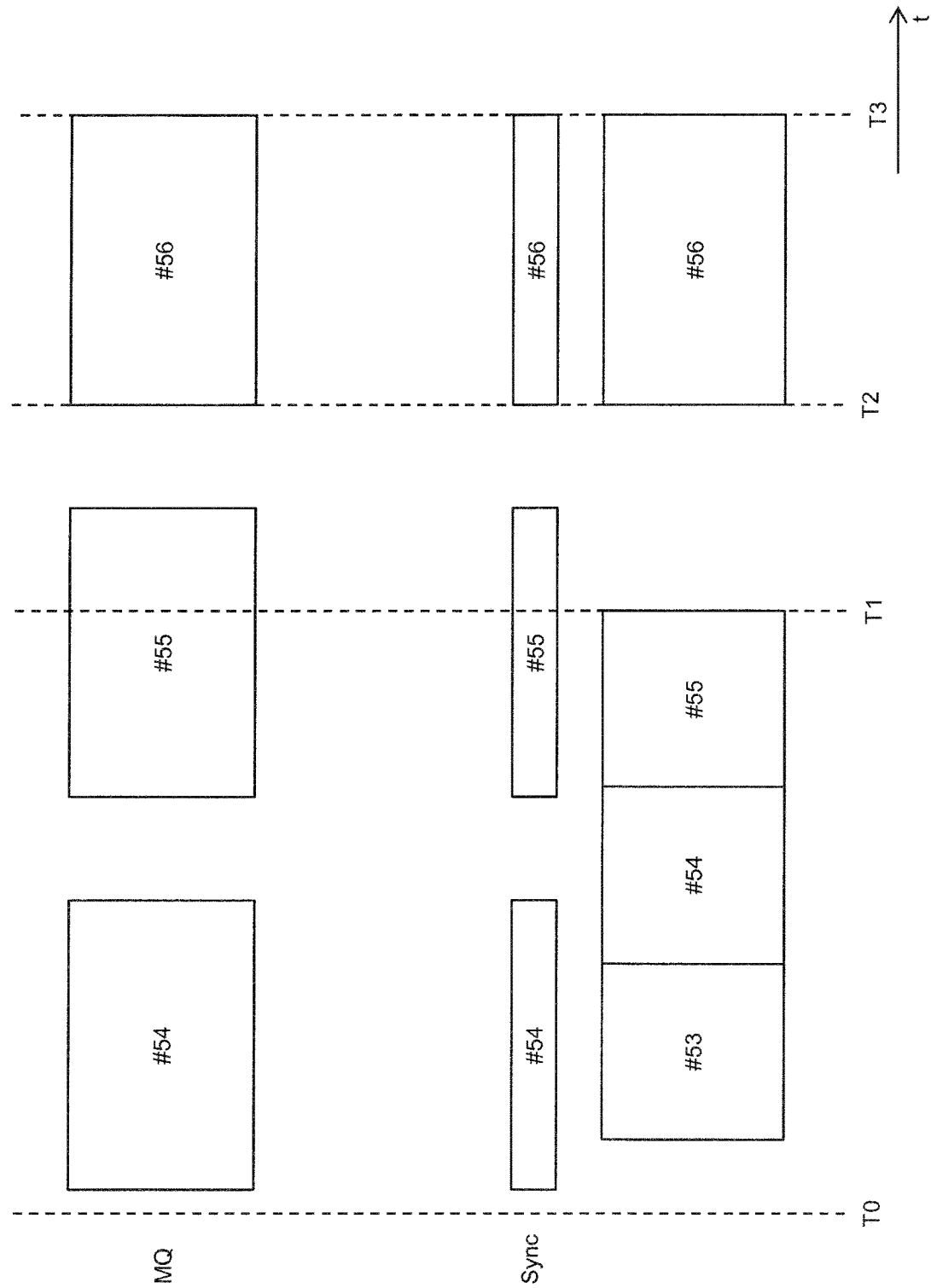
FIG. 4 schematically illustrates utilization of a synchronization channel in an exemplary scenario according to an embodiment of the invention.

FIG. 4 shows an example for illustrating how the client device 100 may utilize the sync stream to switch from receiving the segments of the streamed content to in the unicast transmission mode to receiving the segments of the streamed content in the multicast transmission mode. In the example of FIG. 4, it is assumed that at T0 the media player 140 selects reception of the medium quality multicast content stream. At that point, the client device 100 will initially join the sync stream.

In the example of FIG. 4, segments #54, #55, and #56 of the medium quality multicast content stream are transmitted. From the sync stream, the client device 100 learns which segment is currently being transmitted (e.g., that shortly after T0 the multicast transmission of segment #54 starts). In order to speed up buffering, the client device 100 decides to retrieve segments #53, #54, and #55 using the unicast transmission mode using a higher data rate than the applied for the multicast transmission mode (e.g., at a data rate which is 20% higher than the data rate applied for the multicast transmission mode). Accordingly, at some time, in FIG. 4 at time T1, reception of the segments in the unicast transmission mode will catch up with the transmission of the segments in the multicast transmission mode, i.e., using the unicast transmission mode, the client device 100 will have received that segment which is currently being transmitted in the multicast transmission mode (in the example of FIG. 4, segment #55). At that time, switching to the receiving the next segment (in the example of FIG. 4, segment #55) in the multicast transmission mode is highly efficient, because excessive bandwidth usage due to redundant reception of segments in both the unicast transmission mode and the multicast transmission mode can be avoided. From the sync stream, the client device 100 can derive when transmission of the next segment in the multicast transmission mode starts (in the example of FIG. 4, that transmission of segment #56 starts at T2), and switch to receiving the medium quality multicast content stream at T2.

As can be seen from the example of FIG. 4, by using the unicast transmission mode buffer filling can be expedited. Specifically, the client device 100 is able to buffer three segments by time T1 using the unicast transmission mode, while buffering of three segments using only the multicast transmission mode would have taken until transmission of segment #56 is completed in the multicast transmission mode (at time T3).

Further, the client device 100 is capable of setting an output data rate of the segments from the streaming proxy 150 to the media player 140 in such a way that the media player 140 requests the segments of the streamed content at the appropriate quality level. For this purpose, the client device 100 determines an input data rate at which the segments are received via the subscriber interface by the MC-RX 110 and shapes the output data rate to the media player 140 accordingly. For example, if the client device 100 wants to stimulate the media player 140 to request the segments at a higher quality level, e.g., to switch from the medium quality level to the high quality level, it can set the output data rate to a higher value. Similarly, if the client device 100 wants to stimulate the media player 140 to request the segments at lower higher quality level, e.g., to switch from the medium quality level to the low quality level, it can set the output data rate to a lower value. In any case, the streaming proxy 150 should have received a full segment, before the media player 140 is requesting it. In order to avoid buffer overflows or underflows at the streaming proxy 150, the output data rate should in the long term match the input data rate. The client device 100 may estimate the input data rate by evaluating the reception of segments by the MC-RX 110 and/or by performing other kinds of link estimation on the subscriber interfaces.

Figure 5:
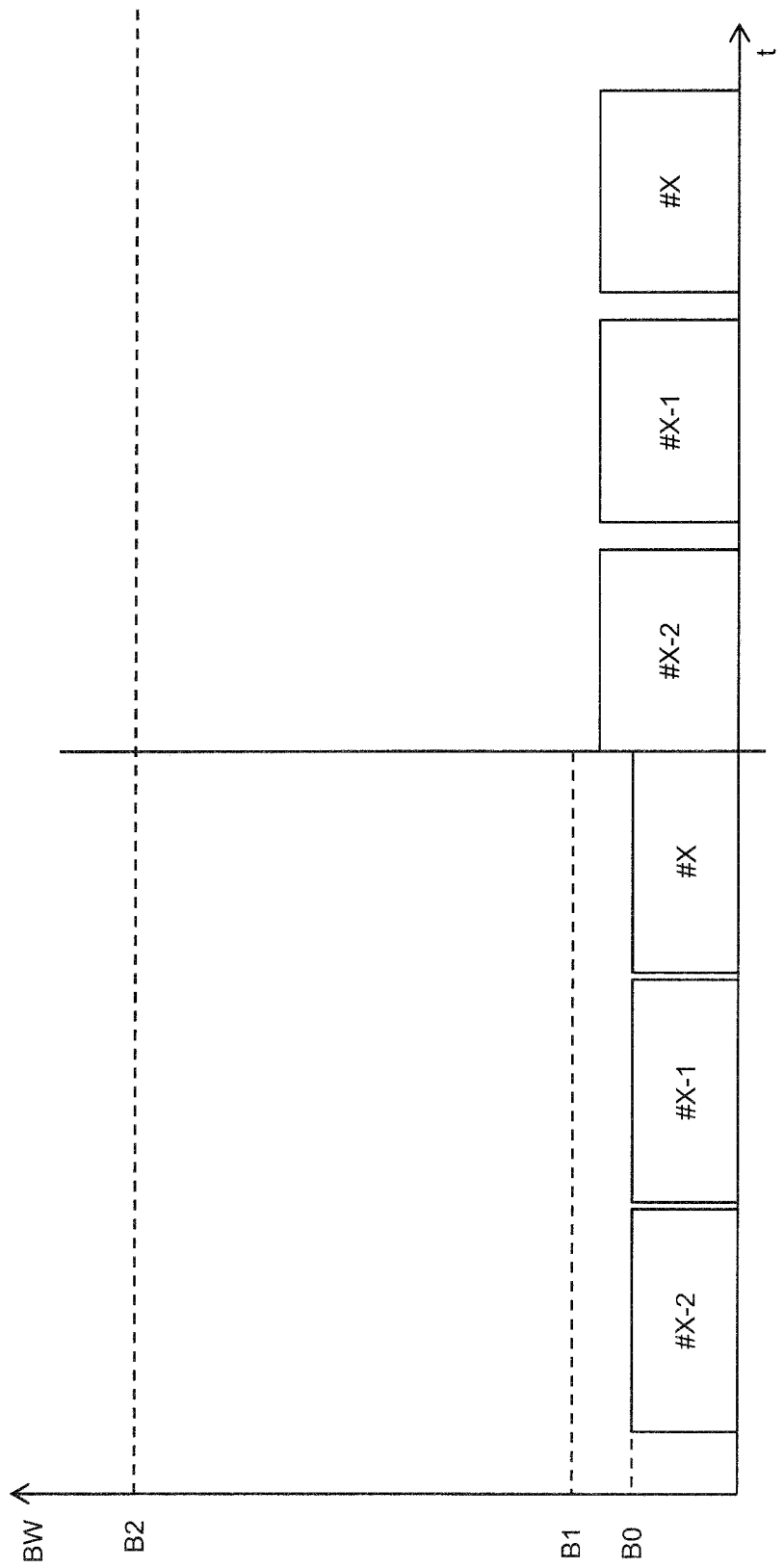
FIG. 5 schematically illustrates rate adaptation according to an embodiment of the invention in an exemplary scenario in which a media player is caused to continue requesting stream segments of the same quality.
Figure 6:
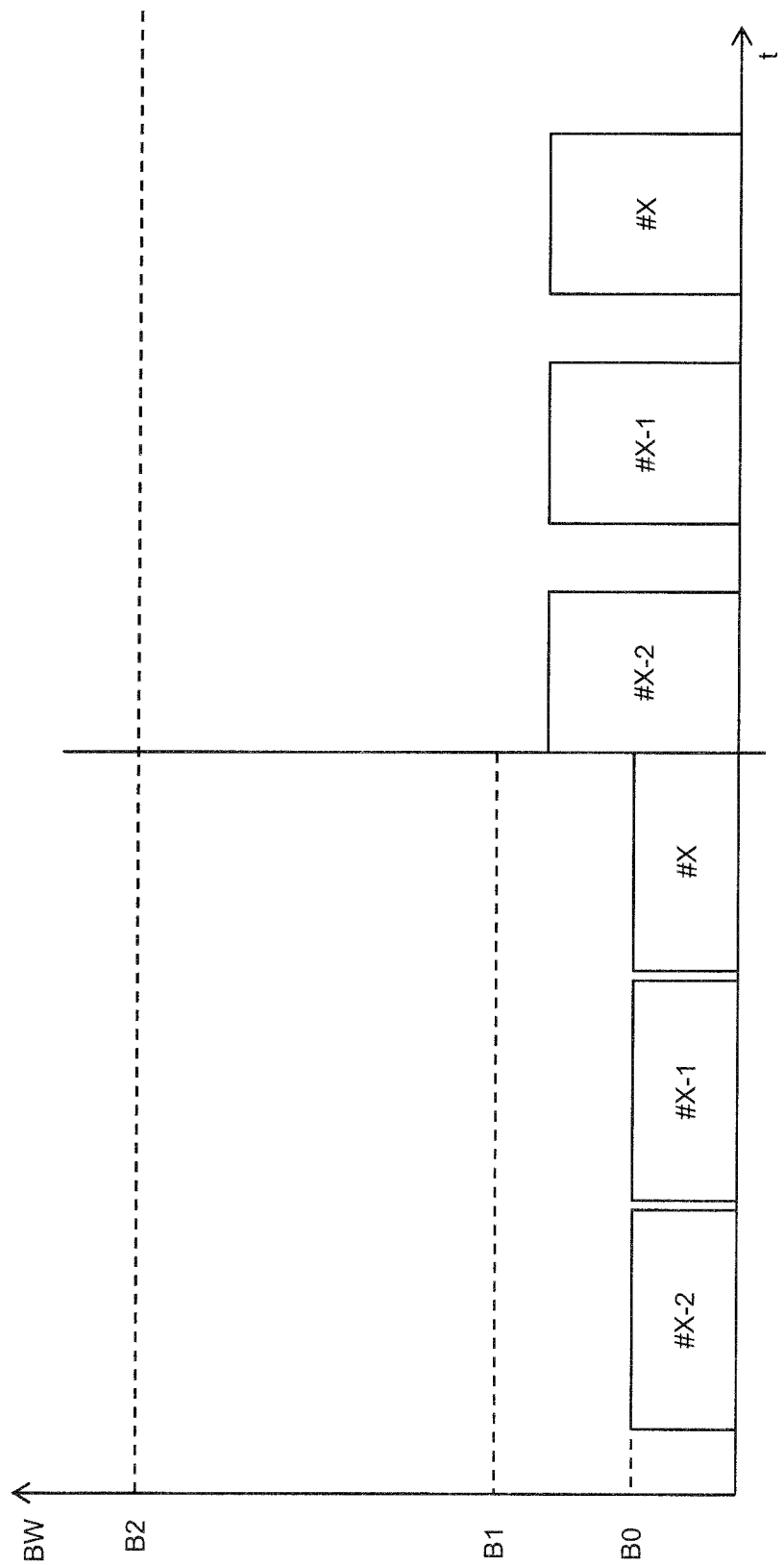
FIG. 6 schematically illustrates rate adaptation according to an embodiment of the invention in an exemplary scenario in which a media player is caused to request stream segments of a higher quality.
Figure 7:
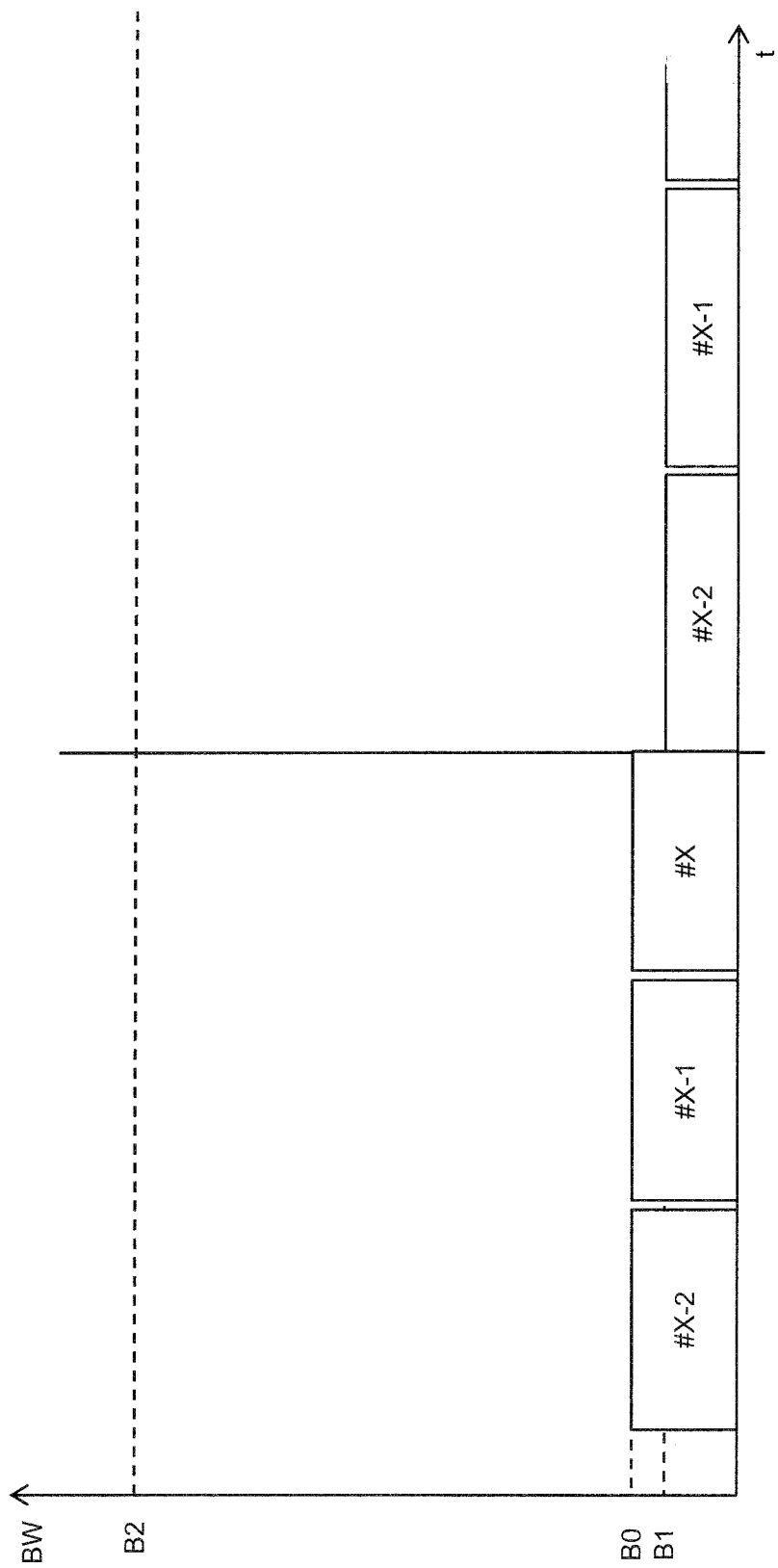
FIG. 7 schematically illustrates rate adaptation according to an embodiment of the invention in an exemplary scenario in which a media player is caused to request stream segments of a lower quality.

FIGS. 5 to 7 illustrate exemplary scenarios of how the client device 100 may set the output data rate to ensure that the media player 140 requests the segments of the streamed content at a desired quality level. In FIGS. 5 to 7, B1 denotes a link bitrate of the subscriber interface, and B2 denotes a link bitrate which is available for outputting the segments from the streaming proxy 150 to the media player 140. As can be seen, the bitrate B2 is significantly higher than the bitrate B1. A media bitrate (denoted by B0) of the streamed content is typically lower than the bitrate B1 so that some capacity is left on the subscriber interface, e.g., for other transmissions. Accordingly, if the media player 140 would estimate the bitrate B2 request the segments of the streamed content at a quality level corresponding to the bitrate B2, the streaming proxy 150 might not be able to continuously retrieve the segments at the requested quality level, and playback of the content by the media player 140 may be interrupted once no more segments are buffered by the streaming proxy 150. Accordingly, the streaming proxy 150 sets the output data rate of the segments to the proxy to a value which matches the bitrate B1.

In the scenario of FIG. 5, it is assumed that the client device 100 determines that the current quality level of the segments requested by the media player 140 is appropriate for the bitrate B1 estimated for the subscriber interface. For example, the client device 100 may determine that the next higher quality level would exceed the capacity of the subscriber interface and thus decide that the media player 140 should keep the current quality level. Accordingly, the client device 100 may set the output rate to the media player 140 to correspond substantially to the media bitrate of the current quality level, e.g., to the media bitrate of the current quality level plus a margin, but lower than the media bitrate of the next higher quality level.

In the scenario of FIG. 6, it is assumed that the client device 100 determines that the bitrate B1 estimated for the subscriber interface is sufficient to support a higher quality level of the streamed content and thus stimulates the media player to request segments of the higher quality level. Accordingly, the client device 100 may increase the output rate to the media player 140 to correspond substantially to the media bitrate of the higher quality level, e.g., to the media bitrate of the higher quality level plus a margin, but lower than the media bitrate of the next higher quality level.

In the scenario of FIG. 7, it is assumed that the client device 100 determines that the bitrate B1 estimated for the subscriber interface is insufficient to continuously support the current quality level of the streamed content and thus stimulates the media player to request segments of a lower quality level. Accordingly, the client device 100 may decrease the output rate to the media player 140 to correspond substantially to the media bitrate of the lower quality level, e.g., to the media bitrate of the lower quality level plus a margin, but lower than the media bitrate of the next higher quality level. It is noted that in the scenario of FIG. 7, the bitrate B1 is shown as being lower than the media bitrate B0. This may be due to the bitrate B1 having dropped after the client device 100 received the illustrated segments. In other words, in some scenario the client device 100 may still have buffered segments corresponding to a media bitrate which too high for the current capacity of the link used by the client device 100 for receiving further segments. In such cases, the client device 100 may output the segments at an output rate which is even lower than the media rate of these segments. In the long term, such operation will typically result in a buffer underflow at the media player 140 or the streaming proxy 150, which however can be avoided by stimulating the media player to start requesting the segments of the lower quality level.

Figure 8:
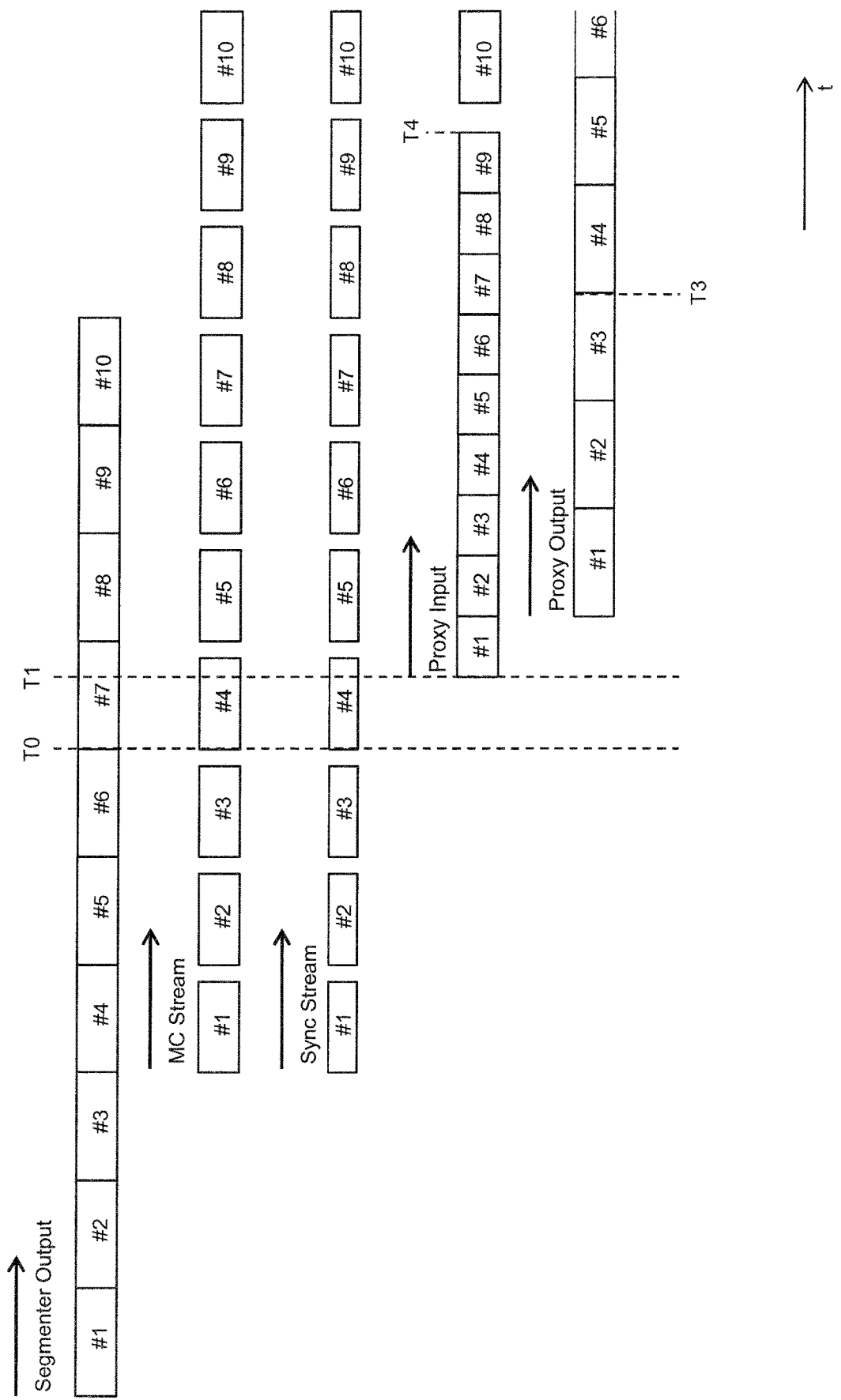
FIG. 8 shows handling of stream segments in an exemplary scenario according to an embodiment of the invention.

FIG. 8 illustrates an exemplary scenario in which the client device 100 utilizes one of the multicast content streams, the sync stream, and unicast reception for providing segments of the streamed content to the media player 140.

As illustrated, the segmenter 210 continuously outputs segments of streamed content, which in the illustrated example are continuously transmitted by the MC-TX 230 in the multicast content stream (MC Stream). In the illustrated example, there is an offset of three segments between the availability of a certain segment from the segmenter 210 and transmission of this segment in the multicast content stream. However, it is to be understood that this offset may be different in other scenarios. Further, there may also be scenarios where the segmenter 210 does not operate in real-time during the multicast delivery of the streamed content and all segments are already generated before the multicast delivery starts.

In the multicast content stream, gaps are inserted between segment boundaries to facilitate joining or leaving the multicast content stream. In the illustrated example, transmission of segment #7 starts at T0, and during transmission of segment #7, reception of the stream by the media player 140 is assumed to be activated at T1, e.g., by the user selecting a corresponding channel. Accordingly, at the time when the reception of the streamed content is activated, transmission of segment #7 in the multicast content stream is in progress. At least some of the segments of the streamed content are also available for retrieval in the unicast transmission mode.

As further illustrated, the sync stream indicates the boundaries of the segments transmitted in the multicast content stream and also identifies the segment which is currently transmitted in the multicast content stream. As mentioned above, the specific segment being transmitted may be identified in terms of its sequence number and/or URL. In the illustrated example the client device 100 is assumed to join the sync stream when activating the reception. At this point, the client device 100 may infer from the sync stream that transmission of segment #7 is currently in progress in the multicast content stream.

On the basis of the sync stream, the client device 100 may thus infer boundaries and identities of the segments in the multicast content stream and synchronize its operations to these boundaries. In the illustrated scenario, it is assumed that the sync stream and the multicast content stream traverse the same transmission path through the communication network, so that time alignment of the segments of the sync stream and the corresponding segment in the multicast content stream is preserved up to reception by the client device 100.

Having derived the segment boundaries and the segment numbers from the sync stream, the client device 100 may determine a set of segments of the streamed content which is to be requested in the unicast transmission mode. In the illustrated example, this set of segments includes old segments which are no longer available through the multicast content stream, in the illustrated example segments #1 to #7, but also segments which are still available through the multicast content stream, in the illustrated example segments #8 and #9.

As illustrated, although segments #1 to #9 are received at a high data rate as applied for the transmission of the segments in the multicast transmission mode, the output to the media player is performed at a lower output data rate, so that the media player 140 will not switch to requesting the segments at a higher quality level. In the illustrated example, the playback may start at T3, when three segments (segments #1 to #3) have been provided to the media player 140. At T4, reception of segment #9 in the unicast transmission mode is completed and transmission of segment #10 in the multicast transmission mode is about to start, i.e., the unicast retrieval of the segments has caught up with the transmission of the segments in the multicast transmission mode. Accordingly, the client device 100 switches to receiving segment #10 and subsequent segments in the multicast transmission mode. When joining the multicast content stream, the client device 100 also leaves the sync stream.

As also illustrated in FIG. 8, there is an offset between the segments received in the multicast transmission mode and the segments output to the media player 140: When segment #10 is received in the multicast transmission mode, segment #6 is being output to the media player 140. This is achieved by the modification of the AST in the MPD. As mentioned above, the modification of the AST in the MPD provides the streaming proxy with sufficient time for buffering some segments using unicast retrieval, and further to avoid that media player 140 requests segments which are not yet available at the streaming proxy.

Figure 9:
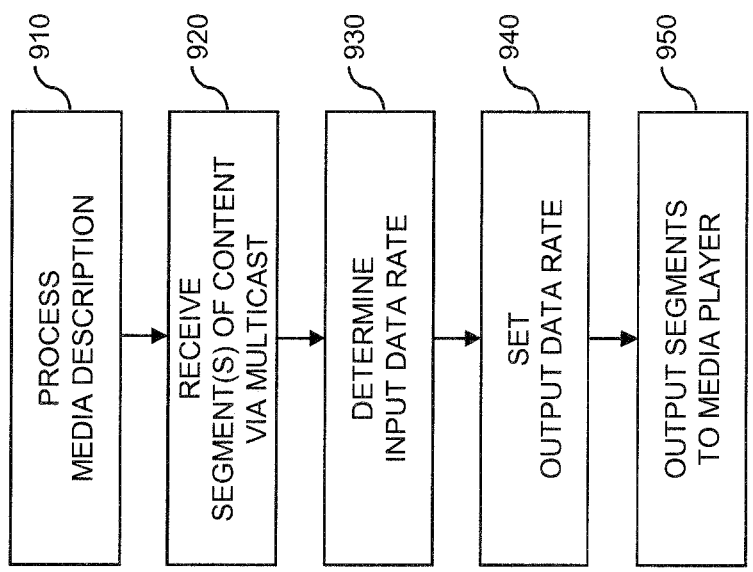
FIG. 9 shows a flowchart for schematically illustrating a method according to an embodiment of the invention.

FIG. 9 shows a flowchart for illustrating a method of streaming content. The method may be utilized for implementing the illustrated concepts in a client device, e.g., the client device 100. Specifically, the method may be utilized by the client device for providing segments of the streamed content to a media player, e.g., the media player 140. The media player may be a part of the client device. Alternatively, the media player could be provided separately from the client device. Specifically, the media player could be connected via a LAN link to the client device. For example, the client device could correspond to a home gateway, and the media player could be implemented by a multimedia device connected to the home gateway, e.g., by a TV, a Blu-Ray or DVD player, a gaming console, a tablet computer, a smartphone, a laptop computer, or a desktop computer. The media player may be based on the DASH technology. However, the media player could also be based on other technologies in which the media player is responsible for adaptively controlling a quality level at which the media player requests the segments of the streamed content.

If a processor-based implementation of the client device is used, the steps of the method may be performed by one or more processors of the client device. In such a case the client device may further comprise a memory in which program code for implementing the below described functionalities is stored.

At optional step 910, the client device may process a media description associated with the streamed content. If the streamed content is streamed based on the DASH technology, the media description may correspond to an MPD of a DASH stream. Specifically, the client device may receive the media description, and the media description may include availability information indicating availability times of segments of the streamed content. If the media description is an MPD, the availability information may correspond to the AST indicated by the MPD. The client device may modify the media description by shifting the availability times to later times, e.g., by shifting the AST of the MPD to a later time. This shifting may correspond to an offset corresponding to a playback duration of one or more segments of the streamed content. For example, the offset could correspond to a playback duration of one, two, three, four, five, or more segments. Having modified the media description, the client device may output the modified media description to the media player.

At step 920, the client device receives segments of the streamed content in a multicast transmission mode. The segments of the streamed content may be segments of a stream according to the DASH technology.

At step 930, the client device determines an input data rate associated with said receiving of the segments in the multicast transmission mode. For example, the client device may measure the input data rate as a data rate at which the segments are received by the client device. In addition or as an alternative, the client device may also apply other techniques for determining the input data rate, e.g., measuring or otherwise estimating a capacity of a link used by the client device for receiving the segments.

At step 940, the client device sets an output data rate. This is accomplished depending on the input data rate determined at step 930. For example, the output data rate may be set to match the input data rate, e.g., by setting the output data rate to a value which does not exceed the input data rate.

At step 950, the client device outputs the received segments at the output data rate to the media player. This is accomplished in response to requests from the media player. The requests may indicate a quality level of the streamed content, and the client device may select the segments to be received in the multicast transmission mode depending on the indicated quality level. For example, the client device may join a multicast stream corresponding to the quality level requested by the media player. Accordingly, the media player may have control of the quality level at which the streamed content is received. However, by setting the output rate at step 940, the client device may stimulate this control to select a higher or lower quality level, or to keep a current quality level. For example, by increasing the output data rate, the client device may cause the media player to send the requests indicating a higher quality level. This may be done if the client device determines that the input data rate determined at step 930 indicates that a link used for transmission of the segments to the client device has sufficient capacity for transmission of the segments of the higher quality level. Further, by decreasing the output data rate, the client device may cause the media player to send the requests indicating a lower quality level. This may be done if the client device determines that the input data rate determined at step 930 indicates that the link used for transmission of the segments to the client device does not have sufficient capacity for transmission of the segments of the current quality level, but only for transmission of the segments of the lower quality level.

Figure 10:
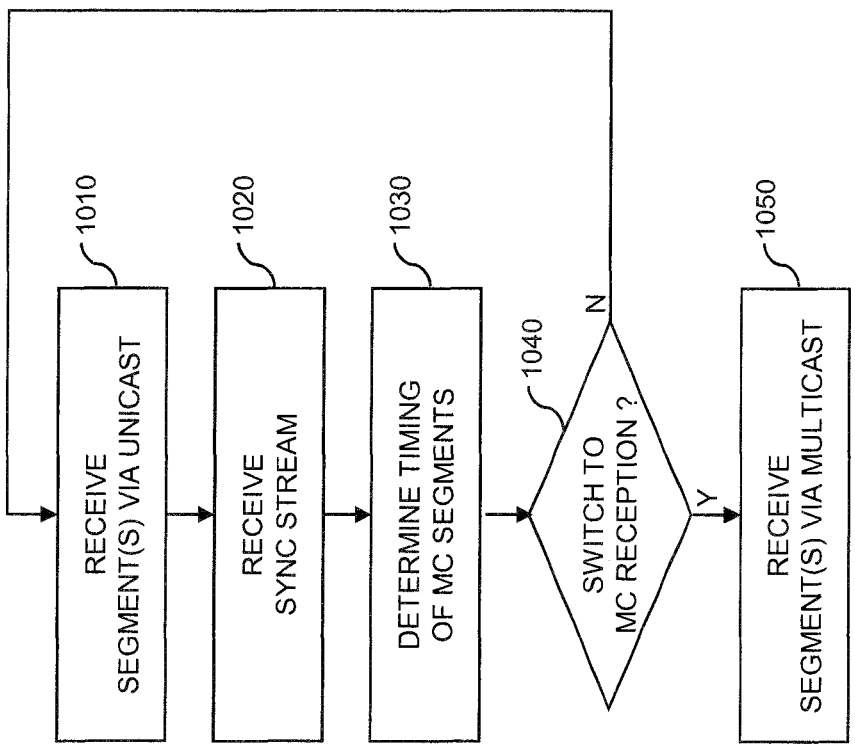
FIG. 10 shows a flowchart for schematically illustrating a method of switching from unicast reception to a multicast reception as used according to an embodiment of the invention.

FIG. 10 shows a flowchart for illustrating a method which may be utilized for implementing the illustrated concepts of switching from unicast delivery to multicast delivery to a client device, e.g., the client device 100. The method of FIG. 10 may be performed as a part of the method of FIG. 9, e.g., when initiating reception of the streamed content or when switching between different quality levels of the streamed content. If a processor-based implementation of the client device is used, the steps of the method may be performed by one or more processors of the client device. In such a case the client device may further comprise a memory in which program code for implementing the below described functionalities is stored.

At step 1010, the client device receives a segment of the streamed content in a unicast transmission mode. This may be accomplished based on the media description optionally received at step 910, e.g., based on a URL indicated by the media description. The client device may for example request the segment of the streamed content by HTTP based mechanisms.

At step 1020, the client device receives a synchronization stream, such as the above-mentioned sync stream. The synchronization stream indicates a timing of segments of the streamed content transmitted in a multicast transmission mode. The synchronization stream indicates the timing separately from the streamed content, i.e., does not include the streamed content. The synchronization stream may be transmitted in the multicast transmission mode and for example include segments transmitted synchronously with the segments of the streamed content to indicate boundaries of the segments of the streamed content transmitted in the multicast transmission mode. The synchronization stream may include, for each segment of the streamed content transmitted in the multicast transmission mode, an indication which identifies the segment and which is transmitted synchronously with the segment. Such indication may include URL of the segment, a sequence number of the segment, a timestamp of the segment, and/or an index of the segment.

Based on the indicated timing, the client device controls switching to receiving one or more segments of the streamed content transmitted in the multicast transmission mode.

As illustrated by step 1030, the controlling of the switching may involve determining the timing of the segments of the streamed content transmitted in the multicast transmission mode, e.g., by determining when transmission of a certain segment in the multicast transmission will start.

At step 1040, the client device may then decide whether to switch to the reception of the segments transmitted in the multicast transmission mode. For example, if the timing determined at step 1030 indicates that segments directly preceding the next segment for which transmission in the multicast transmission mode is about to start have already been received in the unicast transmission mode, the client device may decide to switch to receive the next segment in the multicast transmission mode. In other words, the client device may switch to reception in the multicast transmission mode when the reception in the unicast transmission mode has reached alignment with the timing of the segments transmitted in the multicast transmission mode.

If the client device does not decide to switch to reception in the multicast transmission mode, the client device may return to step 1010 to receive another segment of the streamed content in the unicast transmission mode, as indicated by branch "N". Otherwise, if the client device decides to switch to reception in the multicast transmission mode, the client device may proceed to step 1050 to receive one or more segments of the streamed content in the multicast transmission mode, as indicated by branch "Y".

Accordingly, based on the timing indicated by the synchronization stream, the client device controls switching from receiving a first set of one or more segments of the streamed content transmitted in the unicast transmission mode to receiving a second set of one or more segments of the streamed content transmitted in the multicast transmission mode. The client device may determine the first set of one or more segments of the streamed content depending on the indications in the synchronization stream and request transmission of the first set of one or more segments of the streamed content in the unicast transmission mode.

In some scenarios, the client device may determine, based on the indicated timing, a time of a gap between two consecutive segments of the streamed content transmitted in the multicast transmission mode and performing the switching to the reception in the multicast transmission mode the time of the determined gap. In particular, the client device may switch to the reception in the multicast transmission mode at a time which avoids missing the start of the upcoming segment transmitted in the multicast transmission mode.

In some scenarios, the client device may utilize the timing indicated by the synchronization stream also as input for modifying the media description at step 910 of FIG. 9. In particular, the client device may compare availability times derived from the synchronization stream to the availability times indicated by the media description and modify the media description in such a way that the availability times indicated by the media description correspond to the availability times derived from the synchronization stream.

Figure 11:
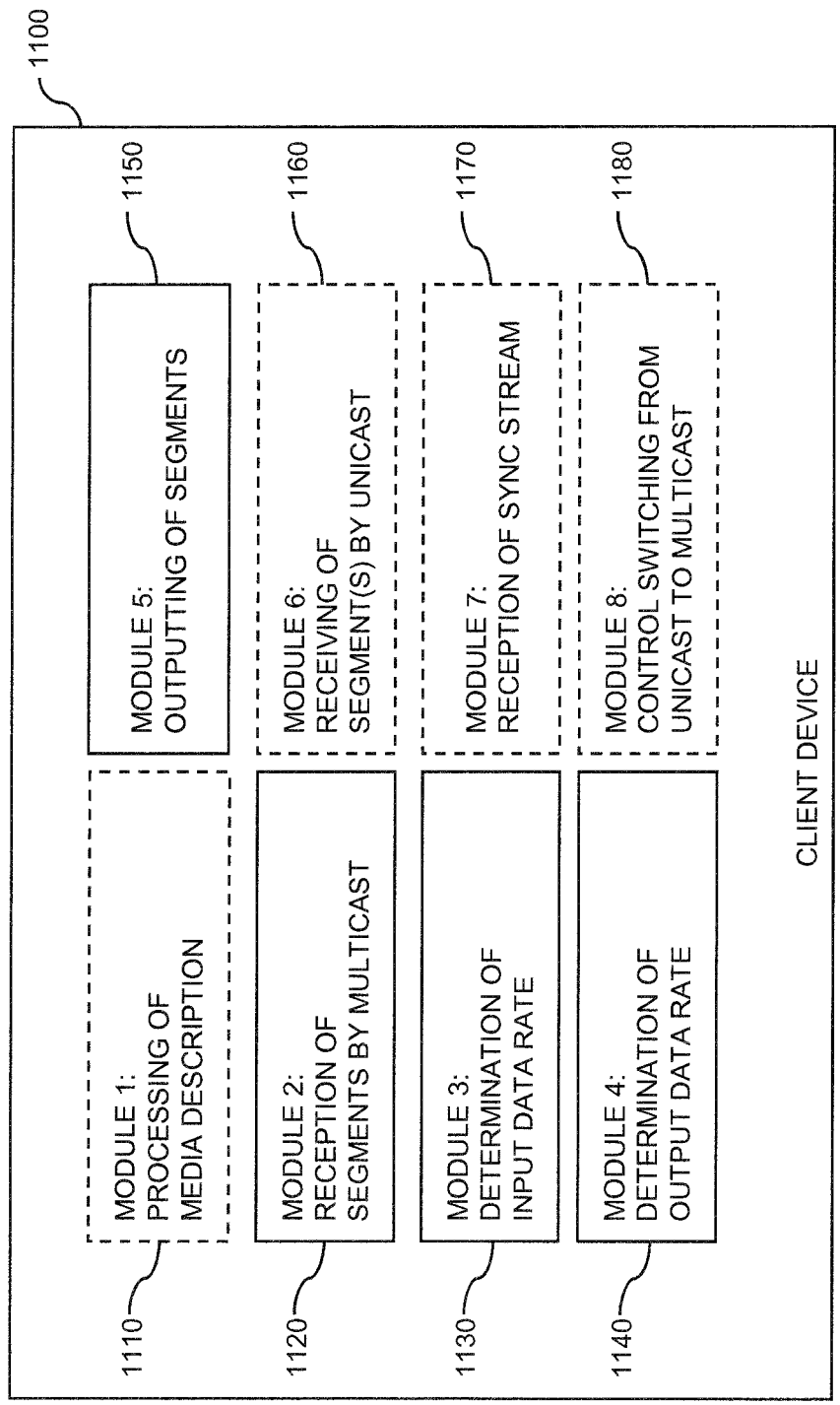
FIG. 11 shows a block diagram for illustrating functionalities of a client device according to an embodiment of the invention.

FIG. 11 shows a block diagram for illustrating functionalities of a client device 1100 which operates according to the method of FIG. 9, and optionally also according to the method of FIG. 10. As illustrated, the client device 1100 may be optionally be provided with a module 1110 configured to process a media description associated with streamed content, such as explained in connection with step 910, a module 1120 configured to receive segments of streamed content in a multicast transmission mode, such as explained in connection with step 920, a module 1130 configured to determine an input data rate, such as explained in connection with step 930, a module 1140 configured to set an output data rate, such as explained in connection with step 940, and a module 1150 configured to output segments of streamed content according to the output data rate to a media player, such as explained in connection with step 950. Further, the client device 1100 may be provided with a module 1160 configured to receive a first set of one or more segments of streamed content in a unicast transmission mode, such as explained in connection with step 1010, a module 1170 configured to receive a synchronization stream indicating, separately from the streamed content, a timing of segments of the streamed content transmitted in a multicast transmission mode, such as explained in connection with step 1020, and a module 1180 configured to control, based on the indicated timing, switching to receiving a second set of one or more segments of the streamed content transmitted in the multicast transmission mode, such as explained in connection with steps 1030 and 1040.

It should be understood that the client device may also include further modules for implementing other functionalities as described above, such as functionalities of the media player 140, and that the modules of the client device do not necessarily represent a hardware structure of the client device, but may also correspond to functional elements, e.g., implemented by hardware, software, or a combination thereof.

Figure 12:
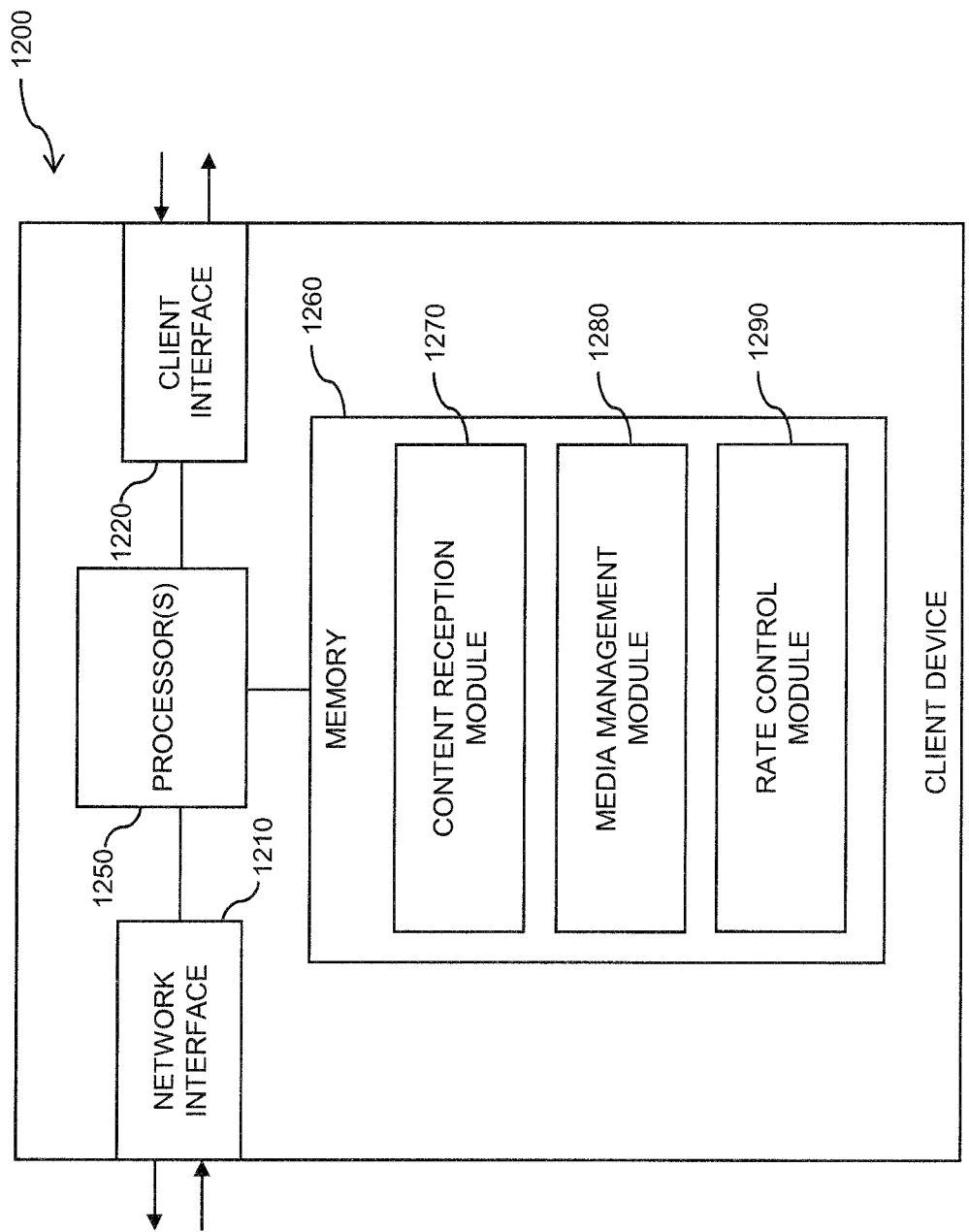
FIG. 12 schematically illustrates structures of a client device according to an embodiment of the invention.

FIG. 12 illustrates exemplary structures which may be used for implementing the above concepts in a client device 1200, such as the client device 100 or 1100. The client device 1200 may for example correspond to a mobile phone or to some other type of portable or stationary computing device. In some scenarios, the client device may also correspond to a device which provides connectivity to a communication network for other devices, such as a home gateway.

As illustrated, the client device 1200 may include a network interface 1210 for enabling access of the client device 1200 to the communication network. The network interface 1210 may implement the subscriber interface illustrated in FIGS. 1 and 2, or may serve for connecting the client device 1200 to such subscriber interface. The network interface 1210 may for example be configured to connect the client device 1200 via a DSL link, a cellular radio link, or a WLAN link to the communication network. Further, the client device 1200 may be provided with a client interface 1220 for connecting to other devices, e.g., via a LAN connection. If the client device 1200 corresponds to a home gateway or similar network connectivity device, the client interface 1220 may for example be used for establishing a connection to a further device which implements the media player for the playback of the streamed content.

Further, the client device 1200 may include one or more processors 1250 coupled to the interface 1210, and a memory 1260 coupled to the processor(s) 1250. The memory 1260 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1260 includes suitably configured program code to be executed by the processor(s) 1250 so as to implement the above-described functionalities of a client device. In particular, the memory 1160 may include various program code modules for causing the client device 1200 to perform processes as described above, e.g., corresponding to the method steps of FIG. 9 and optionally also the method steps of FIG. 10.

As illustrated, the memory 1260 may include a content reception module 1270 for implementing the above-described functionalities of receiving segments of streamed content in the multicast transmission mode or unicast transmission mode, such as explained in connection with step 920 of FIG. 9, or steps 1010 or 1050 of FIG. 10, and optionally of receiving the synchronization stream, such as explained in connection with step 1020 of FIG. 10. Further, the memory 1260 may include a media management module 1280 for implementing the above-described functionalities of adapting a media description associated with the streamed content, such as explained in connection with step 910 of FIG. 9. Further, the memory 1260 may also include a rate control module 1290 for implementing the above-described functionalities of setting the output data rate to the media player, such as described in connection with steps 930 and 940 of FIG. 9.

It is to be understood that the structures as illustrated in FIG. 12 are merely schematic and that the client device 1200 may actually include further components which, for the sake of clarity, have not been illustrated, e.g., further interfaces or processors. Also, it is to be understood that the memory 1260 may include further types of program code modules, which have not been illustrated, e.g., program code modules for implementing known functionalities of a client device, e.g., functionalities of home gateway or functionalities of a multimedia device equipped with a media player for playback of streamed content. According to some embodiments, also a computer program may be provided for implementing functionalities of the client device 1200, e.g., in the form of a physical medium storing the program code and/or other data to be stored in the memory 1260 or by making the program code available for download or by streaming.

As can be seen, the concepts as described above may be used for efficiently streaming content in a communication network. Specifically, the concepts may be utilized for enabling a DASH media player or similar media player to receive streamed content through multicast or broadcast transmissions, e.g., based on IP Multicast. The concepts may be implemented in a manner which is transparent to the media player. Accordingly, the media player may request the segments of the desired quality level in a conventional manner and thus be kept aware of the any changes of the quality level, even if such change is stimulated by from outside of the media player. By using the sync stream, the streaming proxy is enabled to join such multicast or broadcast transmission on time, while avoiding redundant reception of the same content by multicast and unicast.

It is to be understood that the examples and embodiments as explained above are merely illustrative and susceptible to various modifications. For example, the illustrated concepts may be applied in connection with various communication network technologies. Also, it should be noted that in some scenarios the above-mentioned functionalities of the client device may be implemented separately from the player. As mentioned above, the functionalities of the client device 100, in particular the MC-RX 110 and the streaming proxy 150 could be implemented in a first client device, such as a home gateway or multimedia router, and the functionalities of the media player 140 could be implemented in a second client device, such as a streaming box, a television, a smartphone, a tablet computer, a mobile or stationary personal computer, a gaming console, or the like. Further, the sync stream may not only be utilized for tune-in when initially starting reception of a stream, but also when switching between different quality levels of the same stream. Further, in some implementations, utilization of the sync stream and/or additional utilization of unicast reception may be omitted. Further, the illustrated concepts may be applied in connection with various kinds of streaming technologies, content types, and media codecs. Moreover, it is to be understood that the above concepts may be implemented by using correspondingly designed software to be executed by one or more processors of an existing device, or by using dedicated device hardware. Further, it should be noted that the illustrated client device may be implemented as a single device or as a system of multiple interacting devices.

The invention claimed is:

1. A method of streaming content, the method comprising a client device:
    receiving a first set of one or more segments of streamed content in a unicast transmission mode;
    receiving a synchronization stream indicating, separately from the streamed content, a timing of segments of the streamed content transmitted in a multicast transmission mode;
    switching, based on the indicated timing, to receiving the segments in the multicast transmission mode;
    receiving the segments of the streamed content in the multicast transmission mode;
    determining an input data rate based on a data rate of the received segments in the multicast transmission mode;
    setting an output data rate based on the determined input data rate; and
    outputting, in response to requests from a media player, the received segments at the output data rate to the media player.

2. The method of claim 1,
    wherein the requests indicate a quality level of the streamed content; and
    wherein the client device selects the segments to be received in the multicast transmission mode based on the indicated quality level.

3. The method of claim 2, further comprising the client device, by increasing the output data rate, causing the media player to send the requests indicating a higher quality level.

4. The method of claim 2, further comprising the client device, by decreasing the output data rate, causing the media player to send the requests indicating a lower quality level.

5. The method of claim 1, wherein the synchronization stream is transmitted in the multicast transmission mode.

6. The method of claim 1, wherein the synchronization stream comprises, for each segment of the streamed content transmitted in the multicast transmission mode, an indication which identifies the segment and which is transmitted synchronously with the segment.

7. The method of claim 6, wherein the indication is based on a Uniform Resource Locator of the segment.

8. The method of claim 6, wherein the indication is based on a sequence number of the segment.

9. The method of claim 1, further comprising the client device:
    receiving a media description associated with the streamed content, the media description comprising availability information indicating availability times of the segments of the streamed content;
    modifying the media description to shift the indicated availability times to later times; and
    outputting the modified media description to the media player.

10. A client device, comprising:
    processing circuitry; and
    memory containing instructions executable by the processing circuitry, whereby the client device is operative to:
        receive a first set of one or more segments of streamed content in a unicast transmission mode;
        receive a synchronization stream indicating, separately from the streamed content, a timing of segments of the streamed content transmitted in a multicast transmission mode;
        switch, based on the indicated timing, to receive the segments in the multicast transmission mode;
        receive the segments of the streamed content in the multicast transmission mode;
        determine an input data rate based on a data rate of the received segments in the multicast transmission mode;
        set an output data rate based on the determined input data rate; and
        output the received segments, in response to requests from a media player, at the output data rate to the media player.

11. The client device of claim 10,
wherein the requests indicate a quality level of the streamed content; and
wherein the instructions are such that the client device is operative to select the segments to be received in the multicast transmission mode based on the indicated quality level.

12. The client device of claim 11, wherein the instructions are such that the client device is operative to, by increasing the output data rate, cause the media player to send the requests indicating a higher quality level.

13. The client device of claim 11, wherein the instructions are such that the client device is operative to, by decreasing the output data rate, cause the media player to send the requests indicating a lower quality level.

14. The client device of claim 10, wherein the synchronization stream is transmitted in the multicast transmission mode.

15. The client device of claim 10, wherein the synchronization stream comprises, for each segment of the streamed content transmitted in the multicast transmission mode, an indication which identifies the segment and which is transmitted synchronously with the segment.

16. The client device of claim 15, wherein the indication is based on a Uniform Resource Locator of the segment.

17. The client device of claim 10, wherein the instructions are such that the client device is operative to:
receive a media description associated with the streamed content, the media description comprising availability information indicating availability times of the segments of the streamed content;
modify the media description to shift the indicated availability times to later times; and
output the modified media description to the media player.

18. A non-transitory computer readable recording medium storing a computer program product for controlling a client device for streaming content, the computer program product comprising software instructions which, when run on processing circuitry of the client device, cause the client device to:
receive a first set of one or more segments of streamed content in a unicast transmission mode;
receive a synchronization stream indicating, separately from the streamed content, a timing of segments of the streamed content transmitted in a multicast transmission mode;
switch, based on the indicated timing, to receive the segments in the multicast transmission mode;
receive the segments of the streamed content in the multicast transmission mode;
determine an input data rate based on a data rate of the received segments in the multicast transmission mode;
set an output data rate based on the determined input data rate; and
output, in response to requests from a media player, the received segments at the output data rate to the media player.

* * * * *